No. 733,156. PATENTED JULY 7, 1903.
A. L. COLE.
METALLIC WASTE PACKING.
APPLICATION FILED APR. 4, 1902.
NO MODEL.

Witnesses:
A. L. Hodgdon
W. E. Looney

Inventor:
Albert L. Cole
by his attorney
Francis W. Dakin

No. 733,156. Patented July 7, 1903.

UNITED STATES PATENT OFFICE.

ALBERT L. COLE, OF AUBURNDALE, MASSACHUSETTS, ASSIGNOR TO STANDARD PACKING MANUFACTURING COMPANY, A CORPORATION OF MAINE.

METALLIC-WASTE PACKING.

SPECIFICATION forming part of Letters Patent No. 733,156, dated July 7, 1903.

Application filed April 4, 1902. Serial No. 101,429. (No specimens.)

*To all whom it may concern:*

Be it known that I, ALBERT L. COLE, a citizen of the United States, residing at Auburndale, in the county of Middlesex and State of Massachusetts, have invented a new and useful Metallic-Waste Packing for Journal-Boxes and other Uses of which the following is a specification, reference being had therein to the accompanying drawings.

The object of this invention is to provide a packing for journal and cellar boxes on cars and engines and for other uses where a soft loose packing which is durable and non-inflammable is desired.

Figure 1:
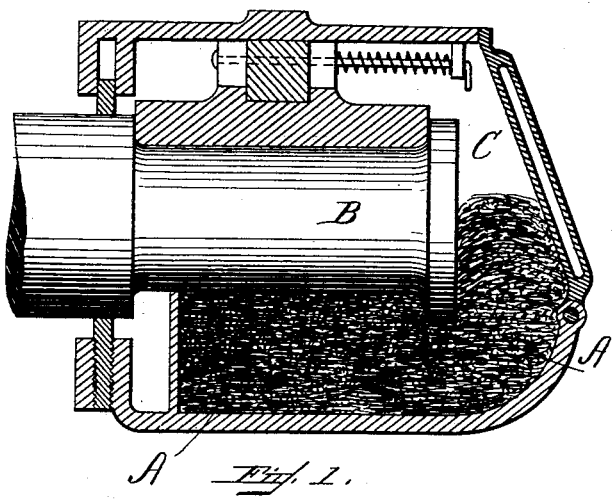
Figure 2:
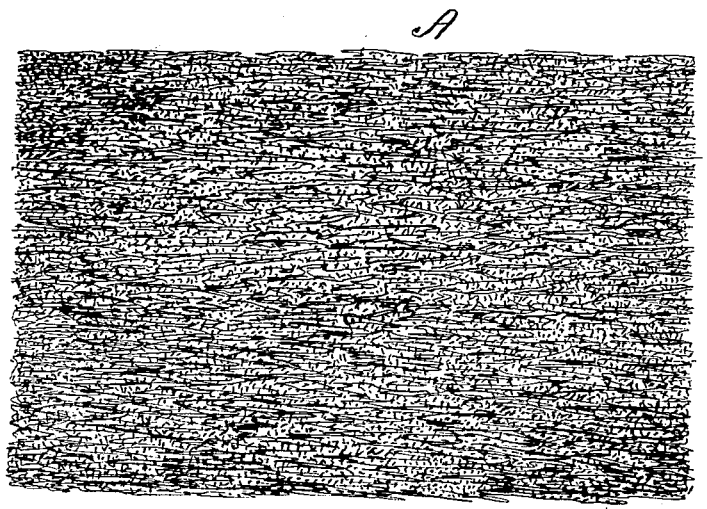

In the accompanying drawings, Figure 1 is a vertical longitudinal section of a journal-box, showing my improved packing A in the packing-space C partially surrounding the journal B; and Fig. 2 is a cross-section of my packing.

This invention consists of a composition of soft-metal fiber mixed with graphite and oil and is made as follows: I first take a soft antifriction metal and reduce it to a fibrous state by shredding or any other suitable means, and in this state the metal resembles common excelsior. This fibered metal is then mixed with powdered graphite and a thick oil to a soft spongy consistency. The proportions of these ingredients may be varied according to the particular use for which the packing is designed; but for a packing for ordinary use the composition should be made of four parts, by weight, of metal fiber and one part each, by weight, of graphite and of oil. The result is a packing which is soft, pliable, and spongy and can be effectively used wherever it is possible to employ wool-waste.

The ordinary method now used for packing journal-boxes, car-trucks, and running-gear in engines and cars where the purpose is simply to lubricate the moving parts is to employ wool-waste saturated with oil or a lubricant. It is a well-known fact, however, that wool is a poor conductor of heat and when used as a packing does not always keep the moving parts cool, which frequently results in a "hot box" and sometimes in a fire. My composition, on the contrary, has all the advantages of wool-waste packing and the additional merits of being durable, efficient, and non-inflammable. A large proportion of my packing composition is metallic, and being an excellent conductor of heat it tends to keep the working parts cool by drawing away the heat, and thereby prevents a hot box, and being non-inflammable a fire is impossible. Furthermore, containing such a large percentage of lubricant, it requires no attention and is more durable than wool-waste.

What I claim is—

A packing composed of antifriction metal drawn out in the form of long, fine threads, powdered graphite and thick oil, all being mixed together in a loose spongy mass, substantially as described.

In testimony whereof I affix my signature in the presence of two witnesses.

ALBERT L. COLE.

Witnesses:
 M. E. COVENEY,
 A. L. HODGDON.